(12) United States Patent
Doppenberg (10) Patent No.: US 7,490,883 B2
(45) Date of Patent: Feb. 17, 2009

(54) APPARATUS FOR TRANSPORTING TRAYS (75) Inventor: Gerrit Doppenberg, St Putten (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 11/681,293

(22) Filed: Mar. 2, 2007

(65) Prior Publication Data
US 2007/0204569 A1 Sep. 6, 2007

(30) Foreign Application Priority Data

Mar. 6, 2006 (EP) ................... 06075519
Feb. 9, 2007 (EP) ................... 07102111

(51) Int. Cl.
B25J 15/00 (2006.01)
B66C 1/66 (2006.01)

(52) U.S. Cl. ........................ 294/106; 294/88
(58) Field of Classification Search .............. 294/88, 294/106, 87.12, 67.31, 81.51, 81.61; 414/753.1
See application file for complete search history.

(56) References Cited

U.S. PATENT DOCUMENTS

| 2,743,954 | A | | 5/1956 | Ostlund |
| 3,069,761 | A | * | 12/1962 | Sommer ................. 29/252 |
| 3,574,387 | A | * | 4/1971 | Hahn .................... 294/88 |
| 4,303,269 | A | * | 12/1981 | Faughnan ............... 294/88 |
| 4,997,339 | A | | 3/1991 | Antonis |
| 5,338,150 | A | | 8/1994 | Focke et al. |
| 6,237,978 | B1 | * | 5/2001 | Bliss .................... 294/88 |
| 6,923,486 | B1 | | 8/2005 | Slagman |
| 2002/0005646 | A1 | | 1/2002 | Bliss et al. |

FOREIGN PATENT DOCUMENTS

| NL | 9101951 | 6/1993 |
| SU | 1615134 | 12/1990 |

* cited by examiner

Primary Examiner—Dean J Kramer
(74) Attorney, Agent, or Firm—Stites & Harbison PLLC; Marvin Petry (57) ABSTRACT An apparatus comprising a gripper frame, connected with an arm or beam for displacing the gripper frame, two gripper blades which are rotatably connected with the gripper frame, two supporting strips each connected along hinges extending substantially in horizontal direction with each respective one of the two supporting strips, a driver which performs a vertical movement for engaging such packaging units in an engagement position and releasing such packaging units in a release position, and a controller connected with the gripper frame, the supporting strips, and the driver. The controller comprise a single lift plate arranged under the gripper frame and between the gripper blades. A vertical upward movement of the lift plate moves the supporting strips to an engagement position to clamp the packaging units between the gripper blades and downward movement of the lift plate moves the supporting strips to a release position.

16 Claims, 6 Drawing Sheets

APPARATUS FOR TRANSPORTING TRAYS

The present invention relates to an apparatus for picking up, transporting, and placing packaging units, in particular trays, for instance trays with eggs, comprising:
- a gripper frame, connected with an arm or beam for therewith displacing, for instance vertically moving and/or rotating, the gripper frame,
- two gripper blades which are rotatably connected with the gripper frame and which engage the packaging units on two opposite sides,
- two supporting strips, with each supporting strip being connected at an upper edge thereof with a lower edge of a gripper blade corresponding with the supporting strip, by means of a hinge joint extending substantially in horizontal direction,
- a driver which upon substantially horizontal pick-up and placement of packaging units performs a vertical movement for bringing the gripper blades and the supporting strips in an engagement position and in a release position for operatively engaging and releasing the packaging units, respectively, and
- control means, connected with the gripper frame, with the supporting strips, and with the driver.

Such an apparatus is known from NL1013281. Described in that publication is a gripper which, with two gripper blades connected with a gripper frame, and furthermore with a rod system between the blades and the gripper frame, is capable of picking up stacks of trays, for instance for eggs, and placing them in boxes. It is indicated how trays, in particular stacks of trays, are carried on strips, for which purpose these strips possess a suitable width. It will be clear to anyone skilled in the art that upon rotation of the strips out of the carrying position, when the strips are directed substantially vertically downwards, such a tray, or a stack of trays, will fall down over a certain distance, viz. the width of these strips. Especially in the case of trays when filled with delicate products as eggs, this entails a risk of damage or also misalignment of the trays.

Further, it will be clear that the gripper described in NL1013281 is commonly used for picking up and placing stacks and consequently possesses a matching size and heaviness. Since such a gripper is used to process stacks, it will be necessary, prior to pick-up, to form stacks, either manually or with a stacker, for instance according to EP386347. In this way, the processing of such packaging units is complicated further.

In order to meet the above drawbacks, the apparatus according to the present invention is characterized in that the supporting strips on a side thereof opposite to the upper edge are each provided with supporting ends; that the control means comprise a single lift plate which is arranged under the gripper frame and between the gripper blades and which adjacent the ends of said hinges is connected with the supporting strips, while upon a vertical upward movement of the lift plate relative to the gripper frame the supporting strips move to the engagement position, in which engagement position the packaging units are engaged, clamped between the gripper blades and supported on supporting ends of the supporting strips, and upon a downward movement of the lift plate relative to the gripper frame the supporting strips move to the release position, whereby the supporting strips substantially move away from each other as well as rotate outwardly, so that in use the packaging units are released.

With this apparatus, a considerably simplified gripper head has been obtained, with great advantage. With it, in a highly suitable manner, individual packaging units such as trays can be picked up and transported, while especially depositing them proceeds very gradually. In particular, the clamped trays will curve down to a slight extent, at deposition come down adjacent the curved portion thereof onto the subjacent supporting surface, and at release settle very gradually and be placed on the supporting surface. This has proven to yield a reliable operation.

According to a further elaboration of the invention, for the purpose of picking up trays provided with nests for receiving for instance eggs or substantially spherical fruit therein, each supporting strip is provided with supporting ends, with the supporting end bounding nest receiving recesses in the supporting strips.

With such supporting strips, a large supporting surface is created, so that the trays are optimally supported.

According to a further elaboration of the invention, the supporting ends may be provided with barb projections which reach into the nest receiving recesses. Preferably, the barb projections are designed such that, in an engagement position of the gripper, they hook into the tray nests. Thus, sagging of the tray is limited as a result of the fact that the edges of the tray engaged by the supporting strips cannot move towards each other.

An apparatus for picking up and placing single trays is also known from US2002/005646. In this publication, it is described how using a complex assembly of connecting pieces an connecting arms, and furthermore a central distributing arm piece, picking up and depositing a tray are effected.

In further embodiments, the apparatus may be characterized in that the lift plate is connected with the supporting strips through four pin-slot connections, with the slots provided in the lift plate and the pins connected with the supporting strips;

that the slots extend substantially horizontally, while the pins extend parallel to the hinges and are arranged on first ends of slotted arms which by the other ends thereof are connected with the supporting strips adjacent the upper edges thereof;

that the apparatus furthermore comprises on both sides mentioned at least one tension spring, each tensioned on the respective side between a corresponding gripper blade and an edge of the gripper frame;

that the lift plate comprises a top plate having side surfaces provided on two opposite sides thereof, which are in the form of substantially an isosceles trapezoid, while the driver is connected with the top plate; and/or that the driver comprises a pneumatically driven piston.

Further details of the apparatus according to the invention will be described with reference to the drawings, in which FIG. 1 schematically shows a side elevation of the apparatus according to the invention prior to engagement of a filled tray.

In the different figures, like numerals designate like parts.

In these FIGS. 1, 2, 3, and 4, the main component of the apparatus is designated as gripper head 1. The gripper head 1 comprises a gripper frame 2, with which gripper blades 3 are connected through shaft connections. At a lower side of the gripper blades 3, supporting strips 4 are connected via hinges 5. Not shown is how the upper side of the gripper frame 2 is connected with an arm or beam which is generally vertically reciprocable, and, if desired, also rotatable. For such a situation, it will be clear that the hinges 5 run substantially horizontally. To absorb possible impact upon pick-up and deposition or placement of the gripper head, buffer springs 50 are arranged on top of the gripper frame 2. Furthermore, in the figures, a driver 6 is represented, which is connected on, one side with the gripper frame 2 and on the other side with a lift plate 7. This driver 6 will also move substantially vertically and hence be capable of moving the lift plate 7 up or down relative to the gripper frame 2. To anyone skilled in the art it will be clear that for such a driver 6 different types can be used, for instance pneumatic, hydraulic or electromagnetic types, more particularly a servomotor.

Figure 2:
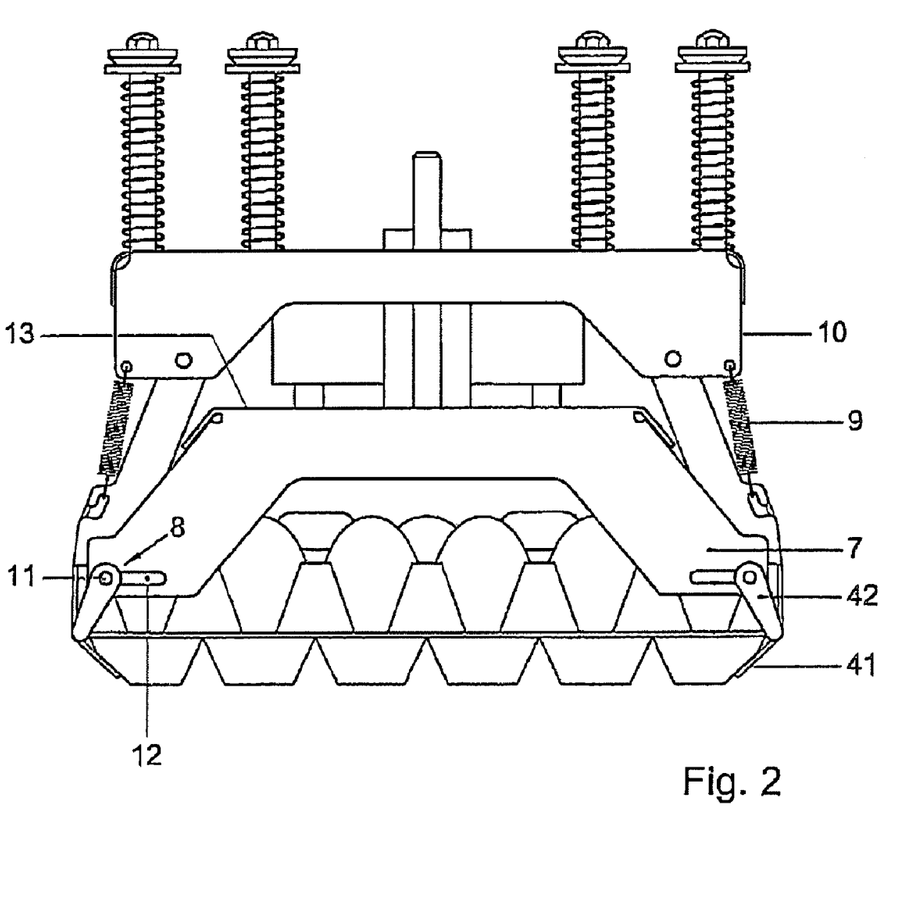
FIG. 2 schematically shows a side elevation of the apparatus according to the invention in its engagement position upon engagement of a filled tray.

In particular in FIG. 2 it is represented how in the engagement position a tray 20 with nests filled with eggs 21 is substantially supported with supporting ends 41 forming the ends of the supporting strips 4.

Various designs of the supporting strips 4, in particular of the supporting ends 41 thereof, are represented in FIGS. 5-8.

It is noted that the gripper blades 3 are placed against opposite sides of a tray 20 so clampingly that the tray 20 bends a little. Furthermore, it is noted that these supporting ends 41 are so wide that they are placed supportingly against the sides of the outer nests on the sides of the tray 20. In other words, the supporting ends 41 of the supporting strips 4 are designed such that they properly support the nests which bound the sides of the tray that are engaged by the gripper blades 3.

In the exemplary embodiment shown, the lift plate 7 has a circumferential shape with a rectangular top plate 13 with side faces 7 which are in the form of an isosceles trapezoid. At the four acute angles of these trapezoids, the lift plate 7 is connected with the supporting strips 4 through four respective pin-slot connections 8. More particularly, pins 11 are arranged on the first ends of slotted arms 42 which are connected by their other ends with the supporting strips 4 adjacent the hinges 5 thereof. These pins 11 can move in slots 12 in the side faces of the lift plate 7. In the exemplary embodiment shown, these slots 12 extend substantially horizontally.

By comparing FIGS. 1, 2, and 3 with each other, the operation of the gripper head 1 can be understood as follows.

Figure 1:
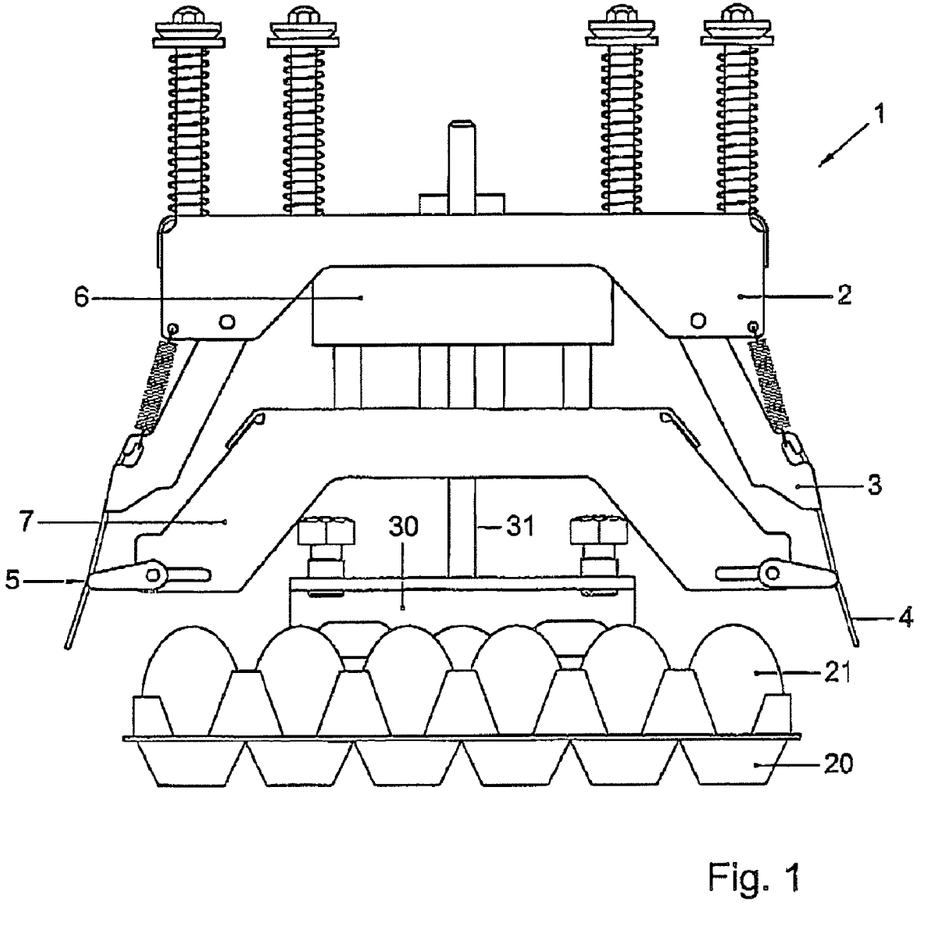

FIG. 1 shows the gripper head 1 in the open position.

Figure 3:
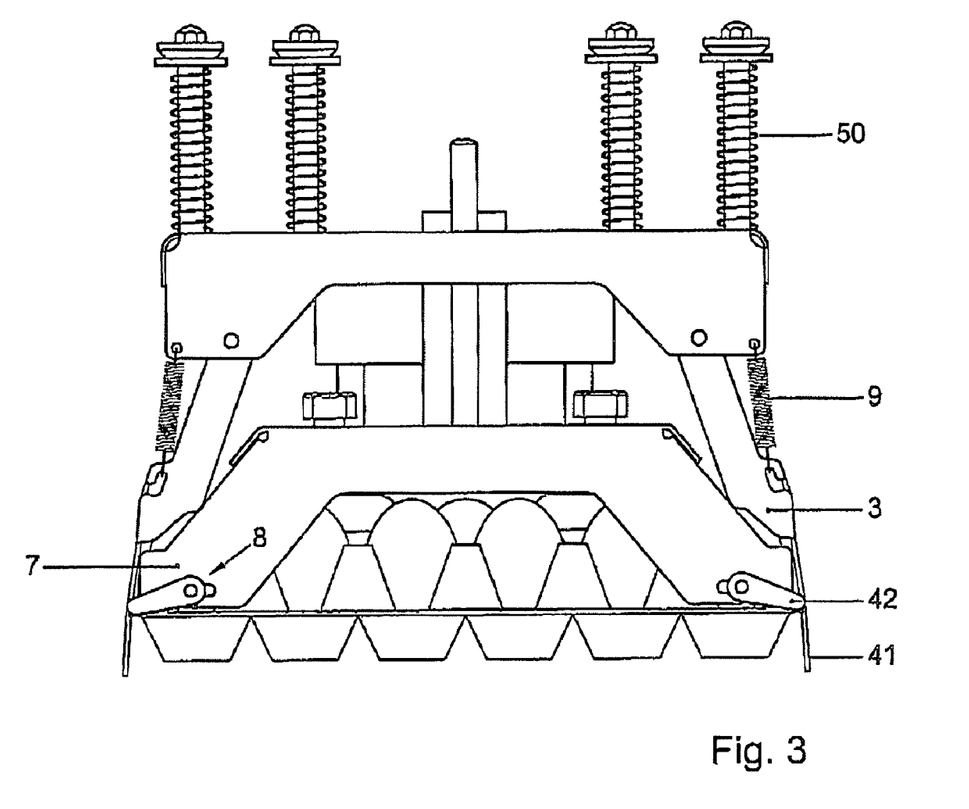
FIG. 3 schematically shows a side elevation of the apparatus according to the invention in its release position at release of a filled tray.
Figure 4:
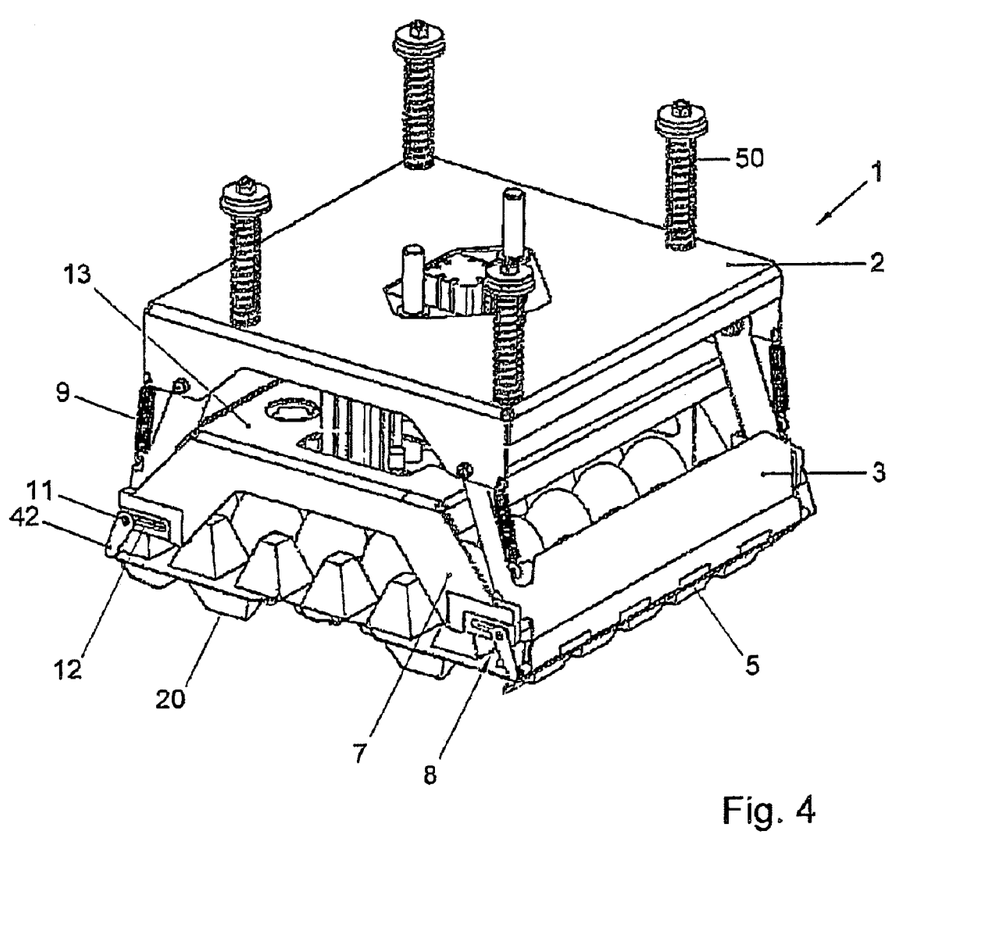
FIG. 4 shows an isometric view of the situation according to FIG. 2.

FIG. 2 shows the gripper head in the engagement position and FIG. 3 shows the gripper head 1 in a release position in which the tray can be released in an outer box.

In FIG. 1, the gripper head 1 is positioned in the proper position above the filled tray 20 with the aid of the arm or beam mentioned earlier but not shown. The supporting strips 4 are then in a position open as far as possible. This is accomplished by pushing the lift plate 7 with the driver 6 downwardly relative to the gripper frame 2, Whereby via the pin-slot connections 8 these supporting strips 4 and also the gripper blades 3 are moved outwards, which movements of the supporting strips 4 can be seen as a combination of translation and rotation. This proper positioning will for instance be controlled by a computer program, with sensors producing control signals to be processed, for heights, widths, and the like.

In FIG. 2, the gripper head 1 is moved down and the lift plate 7 is moved up relative to the gripper frame 2 with the driver 6, whereby via the pin-slot connections 8 the supporting strips 4 rotate substantially inwards against the tray 20 and will thereby support the tray 20 with the supporting ends 41. In this engagement position, the tray can be picked up and moved to a further desired location or position. In most cases, the gripper head will be moved up and either be displaced to a box or crate or wait for a box or crate to be placed under it to allow the tray then to be placed in it.

In FIG. 3, finally, it is represented how the driver 6 has moved the lift plate 7 to some extent, or also over the earlier-shown height, down relative to the gripper frame 2, whereby via the pin-slot connections the supporting strips 4 will rotate outwards again. Here, also the operation of tension springs 9 will be elucidated, which, mostly four in number, two on each side of the gripper head 1, connect the gripper blades 2 with a gripper frame edge 10 situated on corresponding sides of the gripper head 1. More particularly, in the exemplary embodiment shown, these springs 9 will ensure that depending on the position of the driver 6 the assembly of supporting strip 4 and gripper blade 3 always takes up a fixed position when capable of moving freely. Furthermore, the pin-slot connections 8 make it possible, at placement in a box or crate, often called outer box, for the supporting strips 4, at release, to be rotated outwards by the tension springs 9, whereby the supporting ends 41 will take up a substantially vertical position against the walls of the outer box, allowing them to be moved up along these walls upon release, placement, and leaving behind of the tray or packaging unit in the outer box.

Shown furthermore in the figures is a plate 30 with drive 31, which is used as a detainer or pusher in picking up or placing packaging units. This drive also may be, for instance, pneumatic, hydraulic or electromagnetic.

Figure 5:
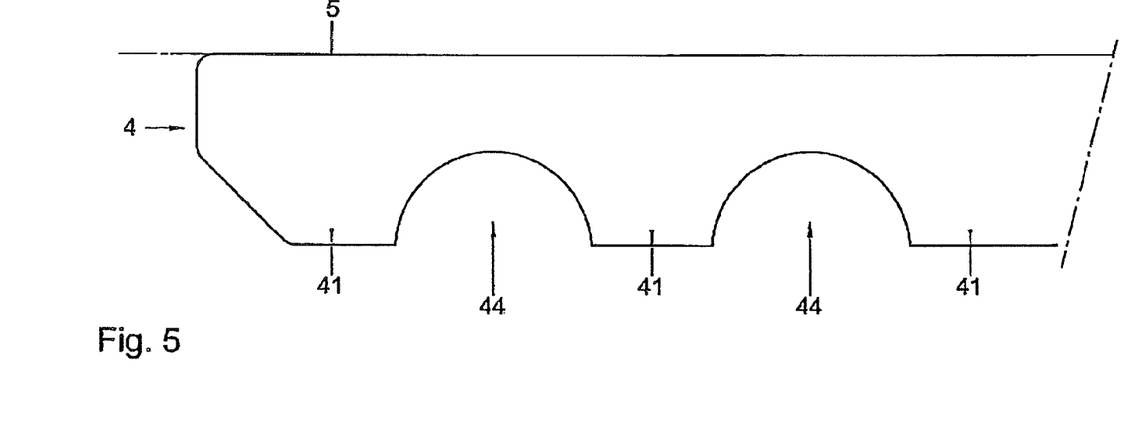
FIG. 5 shows a top plan view of a first exemplary embodiment of a supporting strip.

FIG. 5 shows an exemplary embodiment of a supporting strip 4. Reference numeral 5 indicates the position of the hinge by means of which the supporting strip 4 is attached to a gripper blade 3. On the side of the supporting strip 4 remote from the gripper blade 3, the supporting strip 4 is provided with the supporting ends 41 mentioned earlier. These supporting ends 41 in the exemplary embodiment of FIG. 5 bound nest receiving recesses 44. The nests of a tray can be received and comprised in the nest receiving recesses 44, so that the tray is adequately supported.

Figure 6:
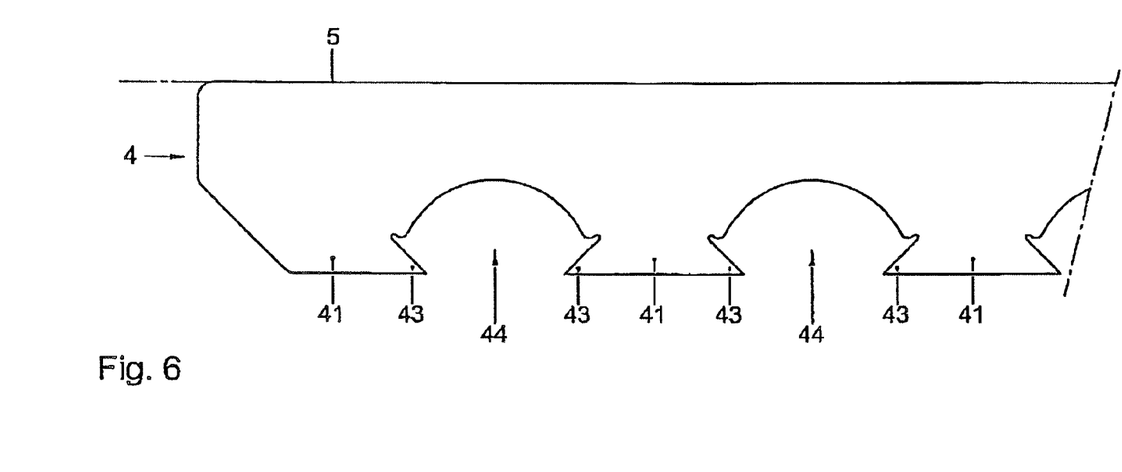
FIG. 6 shows a top plan view of a second exemplary embodiment of a supporting strip.
Figure 7:
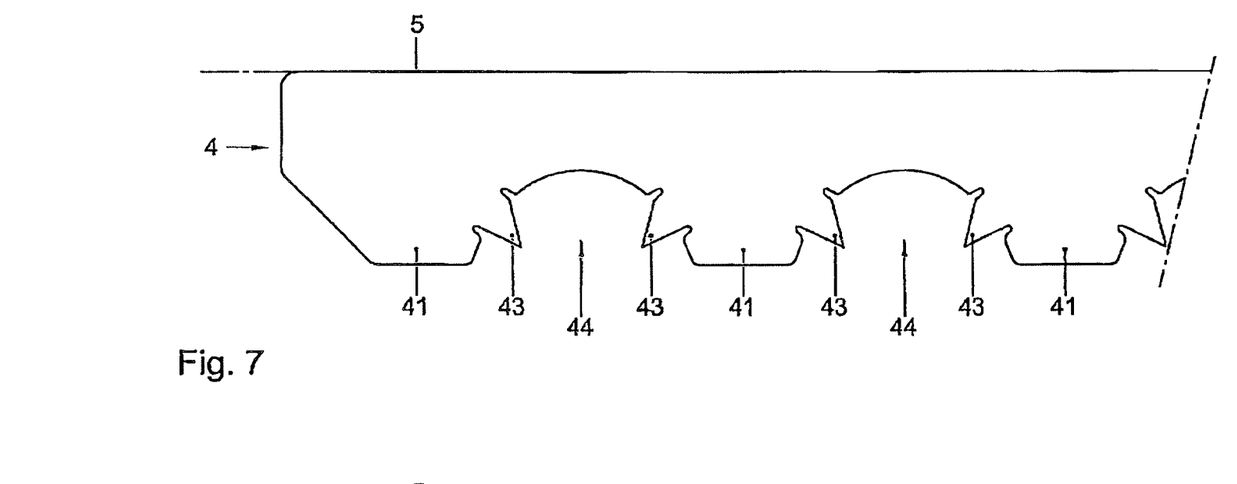
FIG. 7 shows a top plan view of a third exemplary embodiment of a supporting strip.
Figure 8:
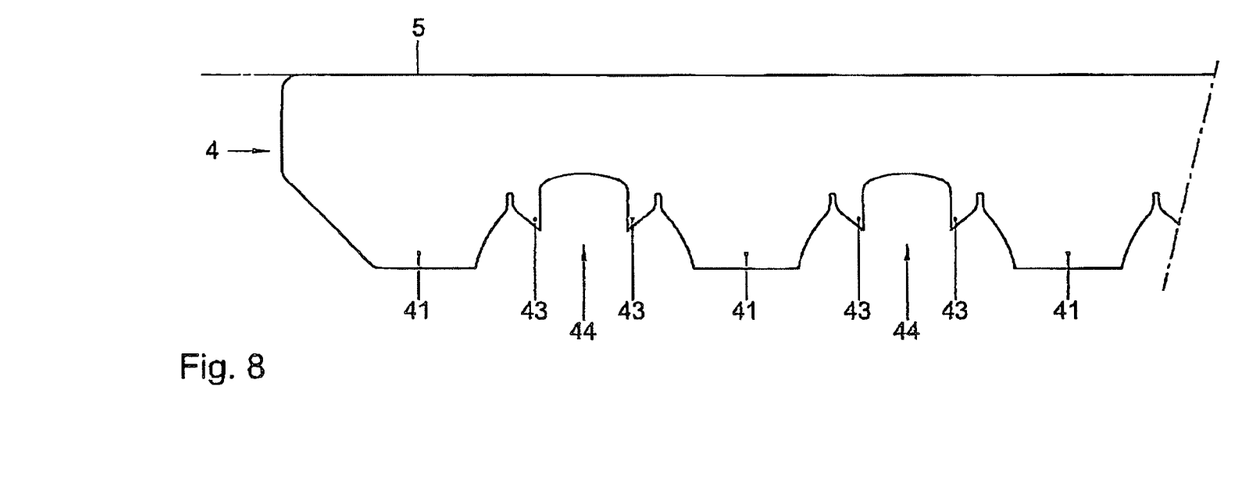
FIG. 8 shows a top plan view of a fourth exemplary embodiment of a supporting strip.

In FIGS. 6-8, variants of supporting strips are represented. All these variants are distinguished from the variant represented in FIG. 5 by the barbs 43 reaching into the nest receiving recesses 44. These barbs 43 engage in the trays and prevent the sides of the trays engaged by the barbs from moving towards each other. This prevents sagging of the trays.

It will be clear to anyone skilled in the art that small deviations and also closely related embodiments are to be understood to be covered by the scope of protection of the appended claims. For instance, the pin-slot connections can be so designed, for instance with a slot following a well-defined curve, that a predetermined movement of the supporting strips is thereby obtained, in which case the tension springs will be omitted. Also, a slot may be chosen which is open at one of the ends and at the same time continues far enough for the pin never to run out of it, which creates the possibility of exchanging the supporting strips in a rapid and effective manner for other types of packaging units. A further possibility is to use electromagnetic couplings for the connections of the lift plate with the supporting strips.

The invention claimed is:

1. An apparatus for picking up, transporting, and placing packaging units including trays with eggs, the apparatus comprising:
   a gripper frame;
   two gripper blades rotatably connected with the gripper frame, the gripper blades for use in engaging the packaging units on two opposite sides, two supporting strips, each being connected at an upper edge thereof with a lower edge of a respective gripper blade, by means of a hinge joint extending substantially in horizontal direction, each supporting strip having a supporting end opposite the upper edge thereof, wherein the supporting ends define nest receiving recesses in the supporting strips;
   a driver which upon substantially horizontal pick-up and placement of packaging units performs a vertical movement for bringing the gripper blades and the supporting strips in an engagement position and in a release position for operatively engaging and releasing the packaging units, respectively; and
   control means connected with the gripper frame, with the supporting strips, and with the driver, the control means comprising a single lift plate arranged under the gripper frame and between the gripper blades and which, adjacent the ends of said hinges, is connected with the supporting strips,
   wherein upon vertical upward movement of the lift plate, relative to the gripper frame, the supporting strips move to the engagement position, where, in the engagement position, the packaging units are engaged, clamped between the gripper blades and supported on supporting ends of the supporting strips, and
   wherein, upon a downward movement of the lift plate, relative to the gripper frame, the supporting strips move to the release position, whereby the supporting strips substantially move away from each other as well as rotate outwardly, thereby releasing the packaging units.

2. An apparatus according to claim 1, wherein the supporting ends are provided with barb projections which reach into the nest receiving recesses.

3. The apparatus according to claim 2, wherein the driver comprises a pneumatically driven piston.

4. The apparatus according to claim 2, wherein the lift plate is connected with the supporting strips through four pin-slot connections, with the slots provided in the lift plate and with the pins connected with the supporting strips.

5. The apparatus according to claim 2, wherein the lift plate comprises a top plate having side surfaces provided on two opposite sides thereof which are in the form of substantially an isosceles trapezoid, and the driver is connected with the top plate.

6. The apparatus according to claim 2, wherein the apparatus further comprises, at least two tension springs, one on each side of the apparatus, each one of the springs tensioned on a respective side between a corresponding gripper blade and an edge of the gripper frame.

7. The apparatus according to claim 1, wherein the driver comprises a pneumatically driven piston.

8. An apparatus for picking up, transporting, and placing packaging units including trays with eggs, the apparatus comprising:
   a gripper frame;
   two gripper blades rotatably connected with the gripper frame, the gripper blades for use in engaging the packaging units on two opposite sides, two supporting strips, each being connected at an upper edge thereof with a lower edge of a respective gripper blade by means of a hinge joint extending substantially in horizontal direction, each supporting strip having a supporting end opposite the upper edge thereof;
   a driver which upon substantially horizontal pick-up and placement of packaging units performs a vertical movement for bringing the gripper blades and the supporting strips in an engagement position and in a release position for operatively engaging and releasing the packaging units, respectively; and
   control means connected with the gripper frame, with the supporting strips, and with the driver, the control means comprising a single lift plate arranged under the gripper frame and between the gripper blades and which, adjacent the ends of said hinges, is connected with the supporting strips, the lift plate connected with the supporting strips through four pin-slot connections, with the slots provided in the lift plate and with the pins connected with the supporting strips;
   wherein upon vertical upward movement of the lift plate, relative to the gripper frame, the supporting strips move to the engagement position, where in the engagement position, the packaging units are engaged, clamped between the gripper blades and supported on supporting ends of the supporting strips, and
   wherein upon vertical upward movement of the lift plate, relative to the gripper frame, the supporting strips move to the engagement position, in which engagement position, the packaging units are engaged, clamped between the gripper blades and supported on supporting ends of the supporting strips, and
   wherein, upon a downward movement of the lift plate, relative to the gripper frame, the supporting strips move to the release position, whereby the supporting strips substantially move away from each other as well as rotate outwardly, thereby releasing the packaging units.

9. The apparatus according to claim 8, wherein the slots extend substantially horizontally, while the pins extend parallel to said hinges and are arranged on first ends of slotted arms which by the other ends thereof are connected with the supporting strips adjacent the upper edges thereof.

10. The apparatus according to claim 9, wherein the lift plate comprises a top plate having side surfaces provided on two opposite sides thereof which are in the form of substantially an isosceles trapezoid, and the driver is connected with the top plate.

11. The apparatus according to claim 9, wherein the apparatus further comprises, at least two tension springs, one on each side of the apparatus, each one of the springs tensioned on a respective side between a corresponding gripper blade and an edge of the gripper frame.

12. The apparatus according to claim 8, wherein the lift plate comprises a top plate having side surfaces provided on two opposite sides thereof which are in the form of substantially an isosceles trapezoid, and the driver is connected with the top plate.

13. The apparatus according to claim 8, wherein the apparatus further comprises, at least two tension springs, one on each side of the apparatus, each one of the springs tensioned on a respective side between a corresponding gripper blade and an edge of the gripper frame.

14. An apparatus for picking up, transporting, and placing packaging units including trays with eggs, the apparatus comprising:
   a gripper frame;

two gripper blades rotatably connected with the gripper frame, the gripper blades for use in engaging the packaging units on two opposite sides, two supporting strips, each being connected at an upper edge thereof with a lower edge of a respective gripper blade by means of a hinge joint extending substantially in horizontal direction, each supporting strip having a supporting end opposite the upper edge thereof;

a driver which upon substantially horizontal pick-up and placement of packaging units performs a vertical movement for bringing the gripper blades and the supporting strips in an engagement position and in a release position for operatively engaging and releasing the packaging units, respectively; and control means connected with the gripper frame, with the supporting strips, and with the driver, the control means comprising a single lift plate arranged under the gripper frame and between the gripper blades and which, adjacent the ends of said hinges, is connected with the supporting strips, at least two tension springs, wherein at least one of the at least two springs is tensioned on a respective side of the apparatus between a corresponding gripper blade and an edge of the gripper frame, wherein upon vertical upward movement of the lift plate, relative to the gripper frame, the supporting strips move to the engagement position, where in the engagement position, the packaging units are engaged, clamped between the gripper blades and supported on supporting ends of the supporting strips, and wherein upon vertical upward movement of the lift plate, relative to the gripper frame, the supporting strips move to the engagement position, where, in the engagement position, the packaging units are engaged, clamped between the gripper blades and supported on supporting ends of the supporting strips, and wherein, upon a downward movement of the lift plate, relative to the gripper frame, the supporting strips move to the release position, whereby the supporting strips substantially move away from each other as well as rotate outwardly, thereby releasing the packaging units.

15. The apparatus according to claim 14, wherein the lift plate comprises a top plate having side surfaces provided on two opposite sides thereof which are in the form of substantially an isosceles trapezoid, and the driver is connected with the top plate.

16. An apparatus for picking up, transporting, and placing packaging units including trays with eggs, the apparatus comprising:

a gripper frame;

two gripper blades rotatably connected with the gripper frame, the gripper blades for use in engaging the packaging units on two opposite sides, two supporting strips, each being connected at an upper edge thereof with a lower edge of a respective gripper blade by means of a hinge joint extending substantially in horizontal direction, each supporting strip having a supporting end opposite the upper edge thereof;

a driver which upon substantially horizontal pick-up and placement of packaging units performs a vertical movement for bringing the gripper blades and the supporting strips in an engagement position and in a release position for operatively engaging and releasing the packaging units, respectively; and control means connected with the gripper frame, with the supporting strips, and with the driver, the control means comprising a single lift plate arranged under the gripper frame and between the gripper blades and which, adjacent the ends of said hinges, is connected with the supporting strips, the lift plate comprising a top plate having side surfaces provided on two opposite sides thereof which are in the form of substantially an isosceles trapezoid, and the driver is connected with the top plate, wherein upon vertical upward movement of the lift plate, relative to the gripper frame, the supporting strips move to the engagement position, where in the engagement position, the packaging units are engaged, clamped between the gripper blades and supported on supporting ends of the supporting strips, and wherein, upon a downward movement of the lift plate, relative to the gripper frame, the supporting strips move to the release position, whereby the supporting strips substantially move away from each other as well as rotate outwardly, thereby releasing the packaging units.

* * * * *